United States Patent
Khandelwal et al.

(10) Patent No.: US 9,959,322 B1
(45) Date of Patent: *May 1, 2018

(54) RANKING CHANNELS IN SEARCH

(71) Applicant: Google Inc., Mountain View, CA (US)

(72) Inventors: Nitin Khandelwal, Mountain View, CA (US); Sreedhar Mukkamalla, San Francisco, CA (US); Nitin Jindal, Sunnyvale, CA (US); Fabio Lopiano, Paris (FR); Nicola Muscettola, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/154,379

(22) Filed: May 13, 2016

Related U.S. Application Data

(63) Continuation of application No. 13/896,713, filed on May 17, 2013, now Pat. No. 9,348,922.

(51) Int. Cl.
*G06F 7/00* (2006.01)
*G06F 17/30* (2006.01)

(52) U.S. Cl.
CPC .... *G06F 17/3053* (2013.01); *G06F 17/30528* (2013.01); *G06F 17/30554* (2013.01); *G06F 17/30867* (2013.01)

(58) Field of Classification Search
CPC ............... G06F 17/30817; G06F 17/30707
USPC ........................................................ 707/723
See application file for complete search history.

(56) References Cited

U.S. PATENT DOCUMENTS

| | | | |
|---|---|---|---|
| 7,185,001 B1 | 2/2007 | Burdick et al. | |
| 7,610,282 B1 * | 10/2009 | Datar ................ | G06F 17/30528 |
| 7,657,522 B1 * | 2/2010 | Puzicha ............ | G06F 17/30011 |
| | | | 707/723 |
| 8,145,623 B1 * | 3/2012 | Mehta ................ | G06F 17/3064 |
| | | | 707/713 |
| 8,326,826 B1 * | 12/2012 | Upstill ............. | G06F 17/30873 |
| | | | 707/723 |
| 8,498,984 B1 * | 7/2013 | Hwang ............. | G06F 17/30864 |
| | | | 707/723 |
| 8,595,228 B1 * | 11/2013 | Horling ............. | G06F 17/30867 |
| | | | 707/733 |
| 8,738,612 B1 | 5/2014 | Tourn et al. | |

(Continued)

OTHER PUBLICATIONS

International Searching Authority, "Notification of Transmittal of the International Search Report and the Written Opinion of the International Search Authority, or the Declaration," for International Application No. PCT/US2014/038487, dated Oct. 2, 2014, 9 pages.

*Primary Examiner* — Binh V Ho
(74) *Attorney, Agent, or Firm* — Lowenstein Sandler LLP

(57) ABSTRACT

A search result is modified to include a predetermined number of channels within a predetermined number of a plurality of entries in the search result. The search result is generated in response to a search query. The search result is modified to comprise a predetermined number of channels within a predetermined number of the plurality of entries. The modified search result is updated based on the plurality of entries and a subset of the updated modified search result is selected to be presented in response to the search query. The subset of the updated modified search result comprises the channel and at least one selection of data content.

17 Claims, 7 Drawing Sheets

(56) References Cited

U.S. PATENT DOCUMENTS

| | | | |
|---|---|---|---|
| 8,756,218 B1 | 6/2014 | Spilsbury et al. | |
| 8,972,391 B1* | 3/2015 | McDonnell | G06F 17/3053 |
| | | | 707/727 |
| 2004/0220902 A1* | 11/2004 | Gates | G06F 17/30864 |
| 2005/0144162 A1* | 6/2005 | Liang | G06F 17/30109 |
| 2005/0289109 A1 | 12/2005 | Arrouye et al. | |
| 2006/0064411 A1 | 3/2006 | Gross et al. | |
| 2006/0200490 A1 | 9/2006 | Abbiss | |
| 2007/0239676 A1* | 10/2007 | Stonehocker | G06F 3/0482 |
| 2008/0060013 A1* | 3/2008 | Sarukkai | G06F 17/30781 |
| | | | 725/46 |
| 2008/0243830 A1* | 10/2008 | Abhyanker | G06F 17/30696 |
| 2009/0204581 A1* | 8/2009 | Lim | G06F 17/30867 |
| 2009/0216757 A1 | 8/2009 | Sen et al. | |
| 2010/0023397 A1 | 1/2010 | Goldman et al. | |
| 2010/0082650 A1 | 4/2010 | Wong | |
| 2010/0114908 A1* | 5/2010 | Chand | G06F 17/30637 |
| | | | 707/748 |
| 2010/0138402 A1* | 6/2010 | Burroughs | G06F 17/30684 |
| | | | 707/706 |
| 2010/0138423 A1* | 6/2010 | Moore | G06F 17/30867 |
| | | | 707/741 |
| 2010/0257169 A1 | 10/2010 | Kim et al. | |
| 2010/0257171 A1* | 10/2010 | Shekhawat | G06F 17/30707 |
| | | | 707/738 |
| 2011/0289530 A1 | 11/2011 | Dureau et al. | |
| 2012/0254076 A1* | 10/2012 | Yang | G06F 17/30274 |
| | | | 706/12 |
| 2014/0058984 A1 | 2/2014 | Shinzato | |
| 2014/0172821 A1 | 6/2014 | Hu et al. | |
| 2014/0358907 A1 | 12/2014 | Dai et al. | |
| 2015/0199361 A1* | 7/2015 | McDonnell | G06F 17/3053 |
| | | | 707/723 |

\* cited by examiner

RANKING CHANNELS IN SEARCH

CROSS-REFERENCE TO RELATED APPLICATIONS

This application is a continuation of U.S. Non-Provisional application Ser. No. 13/896,713, filed May 17, 2013, entitled "RANKING CHANNELS IN SEARCH," which is incorporated herein by reference for all purposes.

TECHNICAL FIELD

Embodiments of the present disclosure relate to the field of content hosting services and, more particularly, to a method for ranking channels in search.

BACKGROUND

On the Internet, content hosting services or other applications allow users to upload, view, and share data content. Such data content may include audio clips, movie clips, TV clips, and music videos, as well as content such as blogs, social media pages, short original videos, pictures, photos, articles, avatars, software programs, games, etc.

Data content can be provided to a user through channels. A channel can be data content available from a common source or data content having a common subject or theme. When a search query is submitted to the content hosting service or application, the content hosting service or application can return a search result including multiple entries for a user to view. However, the entries in the search result may not include channels, such that the user does not receive channels related to the search query.

SUMMARY

In one embodiment, a method to rank channels in search is presented. A search result is modified to include a predetermined number of channels within a predetermined number of a plurality of entries in the search result. The search result is generated in response to a search query. The search result is modified to comprise a predetermined number of channels within a predetermined number of the plurality of entries. The modified search result is updated based on the plurality of entries and a subset of the updated modified search result is selected to be presented in response to the search query. The subset of the updated modified search result comprises the channel and at least one selection of data content.

In additional embodiments, computing devices for performing the operations of the above described embodiments are also implemented. Additionally, in embodiments of the disclosure, a computer readable storage media stores methods for performing the operations of the above described embodiments.

BRIEF DESCRIPTION OF THE DRAWINGS

The present disclosure will be understood more fully from the detailed description given below and from the accompanying drawings of various embodiments of the disclosure.

DETAILED DESCRIPTION

Embodiments of the disclosure pertain to ranking channels in search. A channel can be associated with a topic and can be data content available from a common source or data content having a common subject or theme. A user that submits a search query on a topic may want to view a search result with entries that include channels related to the topic. The topic can be a subject, a source, or theme. For example, the topic can be a specific subject, such as musician, workout style, animal, writer, etc. or a general subject such as music, health, etc. In another example, the topic can be a source, such as a creator of the channel. In yet another example, the topic can be a theme, such as art, literature, etc. The user will receive a search result for the search query that will include a certain number of entries. For example, the search result can include 100 entries.

Embodiments of the present disclosure improve the ranking of channels in the search result such that a user is presented with one or more channels in the search result. In some embodiments, the search result is modified such that a predetermined number of channels are included within a predefined number of entries in the search result. For example, if the search result initially includes 10000 entries with 10 channels, the search result can be modified such that the 10 channels are included within the first 1000 entries. If there are not enough channels in the search result, a request for additional channels can be made and the search result modified to include the additional channels. For example, if the search result includes 10000 entries with only 5 channels, the search result can be modified such that an additional 5 channels are included in the 10000 entries, and then further modified such that the 10 channels are included within the first 1000 entries.

Once the search result has been modified to include a sufficient number of channels within a predefined number of entries, the search result is further updated based on the entries in the search result. The modified search result is updated such that the ranking of one or more of the channels in the modified search result is improved based on the entries included in the search result. For example, if the modified search result includes 1000 entries with 10 channels, and channel X previously was ranked 100, the ranking of channel X can be updated to 10 based on the 1000 entries. A subset of the updated modified search result is selected to present in response to the search query. For example, the top 100 results of the updated modified search result can be selected to present to the user in response to the search query. The subset includes a channel and at least one other selection of data content, such as a video, a blog, a newsletter, an audio selection, etc.

Figure 1:
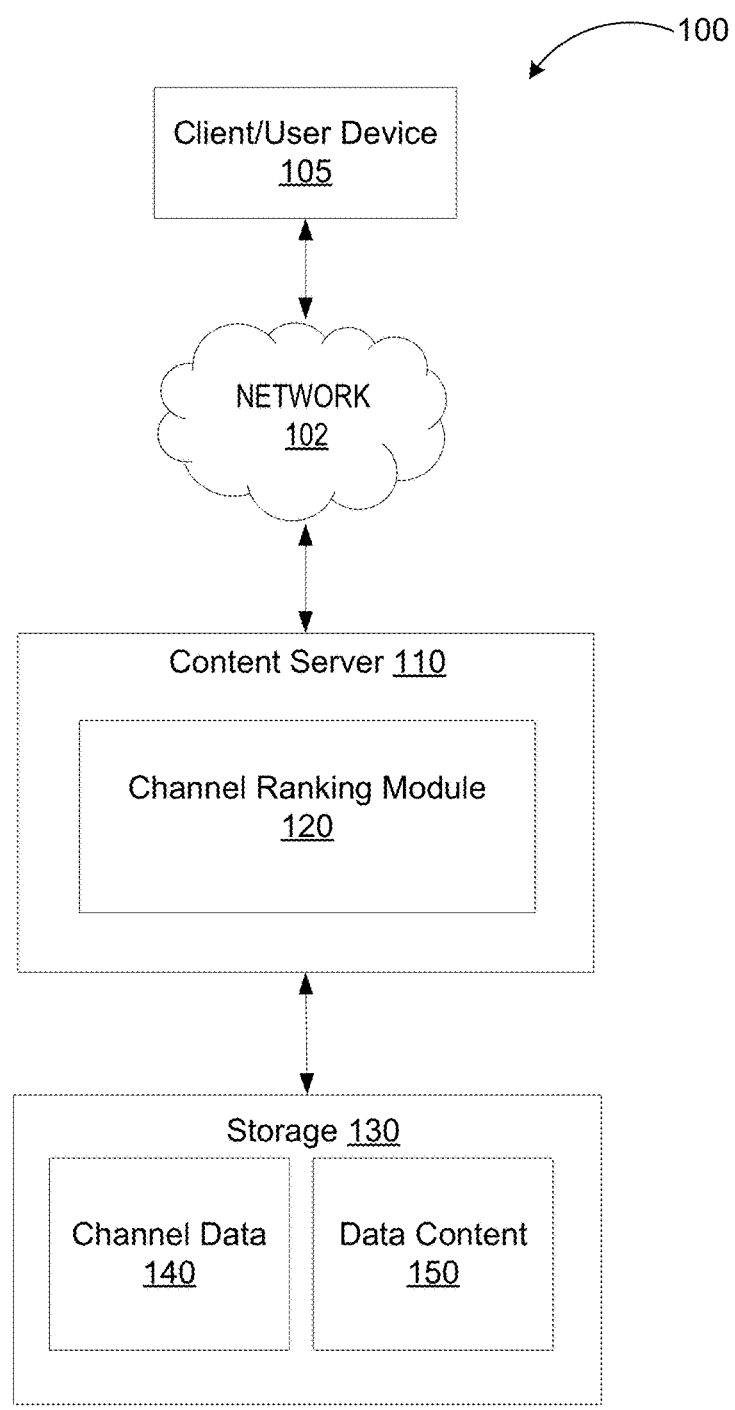
FIG. 1 illustrates an exemplary system architecture, in accordance with one embodiment of the present disclosure.

FIG. 1 illustrates an example system architecture 100, in accordance with one embodiment of the present disclosure. System 100 comprises a client/user device 105 in communication with (e.g., coupled to) a content server 110 over a network 102, and a storage 130. The network 102 may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

The client/user device 105 may be any type of computing device, for example, a device including a processor, a computer-readable medium, and a memory. In some embodiments, the client/user device 105 may be executing a browser application or other application adapted to communicate over Internet related protocols (e.g., TCP/IP and HTTP) and/or display a user interface. While only a single client/user device 105 is shown in FIG. 1, system 100 may support a large number of concurrent sessions with many client/user devices 105.

The content server 110 (e.g., a server providing a content hosting and/or sharing service) may include computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. Embodiments of the disclosure may operate within a single server device or on multiple server devices. Embodiments of the disclosure may operate as a standalone system.

In one embodiment, the content server 110 provides a search result in response to a search query received from one or more of the client/user device 105. For example, the search query may specify a topic of interest (e.g., using one or more keywords), and the search result can include one or more channels and selections of data content (e.g., digital video, streaming video, images, digital music, streaming music, social media information, etc.) in accordance with the topic of interest.

Storage 130 can include one or more writable persistent storage devices, such as memories, tapes or disks. Although each of content server 110 and storage system 130 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

Storage 130 may include channel data 140 and data content 150. Channel data 140 may include identification information for various channels, such as a channel feature, which is an identifier of the channel (e.g., name), one or more identifiers (e.g., names) of selections of data content associated with the channel (e.g., data content selected by an entity that owns the channel), and one or more topics or topic features associated with the channel (e.g., topics related to the selections of data content associated with the channel). Data content 150 can include selections of data content available to the content server 110, such as digital videos (e.g., music, television shows, movies, etc.), streaming videos (e.g., music, television shows, movies, etc.), images, digital audio (e.g., music, television shows, movies, etc.), streaming audio (e.g., music, television shows, movies, etc.), social media information (e.g., blogs, social media service postings, etc.), newsletters, etc. The selections of content can be chosen by a user, made available by a user, uploaded by a user, chosen by a content provider, chosen by a broadcaster, etc.

In embodiments of the disclosure, the content server 110 notifies end users of the types of information that are stored on storage 130, and provides the end users the opportunity to choose not to have such information collected, analyzed, and/or shared.

During operation of system 100, a user accesses system 100 via client/user device 105 over network 102. The content server 110 receives communications from the client/user device 105, and processes and/or directs these communications accordingly.

As discussed above, conventionally, Internet users can be provided with a search result in response to a search query submitted by the Internet users. The search result can include multiple entries. Typically, the search result may not include any channels, may include very few channels, or the channels may rank poorly in the search result (e.g., the channels are in the bottom or last entries in the search result). Embodiments of the present disclosure address this problem by improving the ranking of channels in search.

In particular, in one embodiment, when a user submits a search query via the client/user device 105, the content server 110 presents a final search result with a certain number of entries that includes a channel and a selection of data content related to the search query. In one embodiment, the content server 110 includes a channel ranking module 120 that selects the final search result to present to the user. The channel ranking module 120 can modify an initial search result to include a predetermined number of channels within a predetermined number of entries in the initial search result, update the modified search result based on the entries in the modified search result, and select a subset of the updated modified search result as the final result to present in response to the search query.

The channel ranking module 120 can modify an initial search result to include a predetermined number of channels within a predetermined number of entries in the initial search result by determining if the initial search result has the predetermined number of channels within the predetermined number of entries in the initial search result. Upon determining that the search result does not include the predetermined number of channels within the predetermined number of entries in the initial search result, the channel ranking module 120 can boost one or more channels in the search result such that the one or more channels are within the predetermined number of entries in the initial search result. For example, if the initial search result includes 10,000 entries, the predetermined number of channels is 10 and the predetermined number of entries is 1000, the channel ranking module 120 modifies the initial search result such that the modified search result includes 10 channels within the first 1000 entries.

The channel ranking module 120 can update the modified search result based on the entries in the modified search result by calculating an aggregate score for each channel in the modified search result, determining whether to promote each channel in the modified search result, computing a boost amount for each channel in the modified search result, and updating the ranking of entries in the modified search result based on the boost amount for each channel. The aggregate score for a channel can represent an association of the channel or selections of data content associated with the channel that can be used in ranking the channel (e.g., containment or container relationship). The boost amount for a channel can represent a number by which the ranking of the channel should be improved (e.g., improve the ranking of channel X by 10) or an entry position that the channel should occupy in the search result (e.g., channel X should be entry 10 in the search result).

The channel ranking module 120 can select a subset of the updated modified search result as the final result to present in response to the search query by selecting a predefined number of entries. For example, the channel ranking module 120 can select the top 100 entries in the updated modified search result to present to a user.

In some embodiments, the content server 110 can cause the subset of the updated modified search result to be provided to the user/client device 105. An exemplary user interface including the subset of the updated modified search result is discussed in more detail below in conjunction with FIG. 3.

Figure 2:
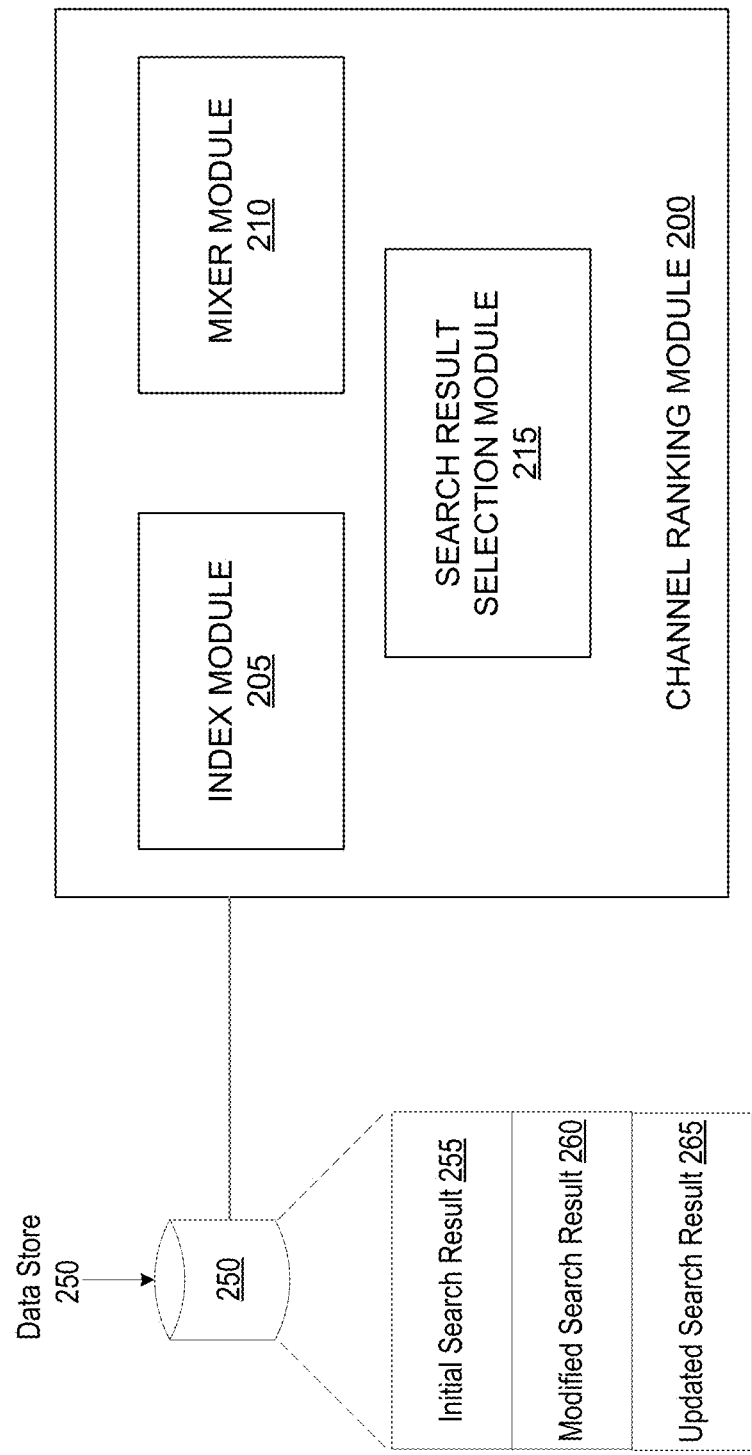
FIG. 2 illustrates a channel ranking module, in accordance with one embodiment of the present disclosure.

FIG. 2 illustrates a channel ranking module 200, in accordance with one embodiment of the present disclosure. The channel ranking module 200 may include an index module 205, a mixer module 210, and a search result selection module 215. More or less components may be included in the channel subscribability module 200 without loss of generality.

The index module 205 may obtain a search result of a search query. The search result can include one or more entries associated with a topic included in the search query. The number of entries in the search result can initially be very large, such as 10,000 or 100,000 entries. The entries can include one or more selections of data content, one or more channel associated with one or more selections of data content, etc. In one embodiment, the index module 205 obtains the search result by performing a search on channel data 140 and data content 150 in storage 130, shown in FIG. 1. In another embodiment, the index module 205 obtains the search result from a sorting tree generated by other computing devices (e.g., other servers not shown in the figures, such as a datacenter) via the network 102 or may obtain the search result from a memory (e.g., a hard disk, flash memory, random access memory (RAM), etc.). The index module 205 can store the search result in storage, such as initial search result 255 in data store 250.

The index module 205 can modify the search result, such as initial search result 255, to include a predetermined number of channels within a predetermined number of entries in the initial search result by determining if the search result has the predetermined number of channels within the predetermined number of entries in the initial search result. Upon determining that the search result does not include the predetermined number of channels within the predetermined number of entries in the initial search result, the index module 205 can boost one or more channels in the search result such that the one or more channels are within the predetermined number of entries in the search result. The index module 205 can boost the one or more channels by appending the channels to be within the predetermined number of entries. The modified search result can be modified to only include the predetermined number of entries. For example, the modified search result can be modified to include 1000 entries, where the initial search result may have included 10,000 entries. The index module 205 can store the modified search result in storage, such as modified search result 260 in data store 250.

The mixer module 210 can update the modified search result, such as modified search result 260, based on the entries in the modified search result. The mixer module 210 can calculate an aggregate score for each channel in the modified search result, determine whether to promote each channel in the modified search result, compute a boost amount for each channel in the modified search result, and update the ranking of entries in the modified search result based on the boost amount for each channel. The aggregate score for a channel can represent an association of the channel or selections of data content associated with the channel that can be used in ranking the channel (e.g., containment or container relationship). The boost amount for a channel can represent a number by which the ranking of the channel should be improved (e.g., improve the ranking of channel X by 10) or an entry position that the channel should occupy in the search result (e.g., channel X should be entry 10 in the search result). The mixer module 210 can store the updated search result in storage, such as updated search result 265 in data store 250.

The search result selection module 215 can select a subset of the updated search result, such as updated search result 265 to present in response to the search query by selecting a predefined number of entries. For example, the search result selection module 215 can select the top 100 entries in the updated search result. The search result selection module 215 can select at least one channel to be included in the subset and at least one selection of data content to be included in the subset.

Figure 3:
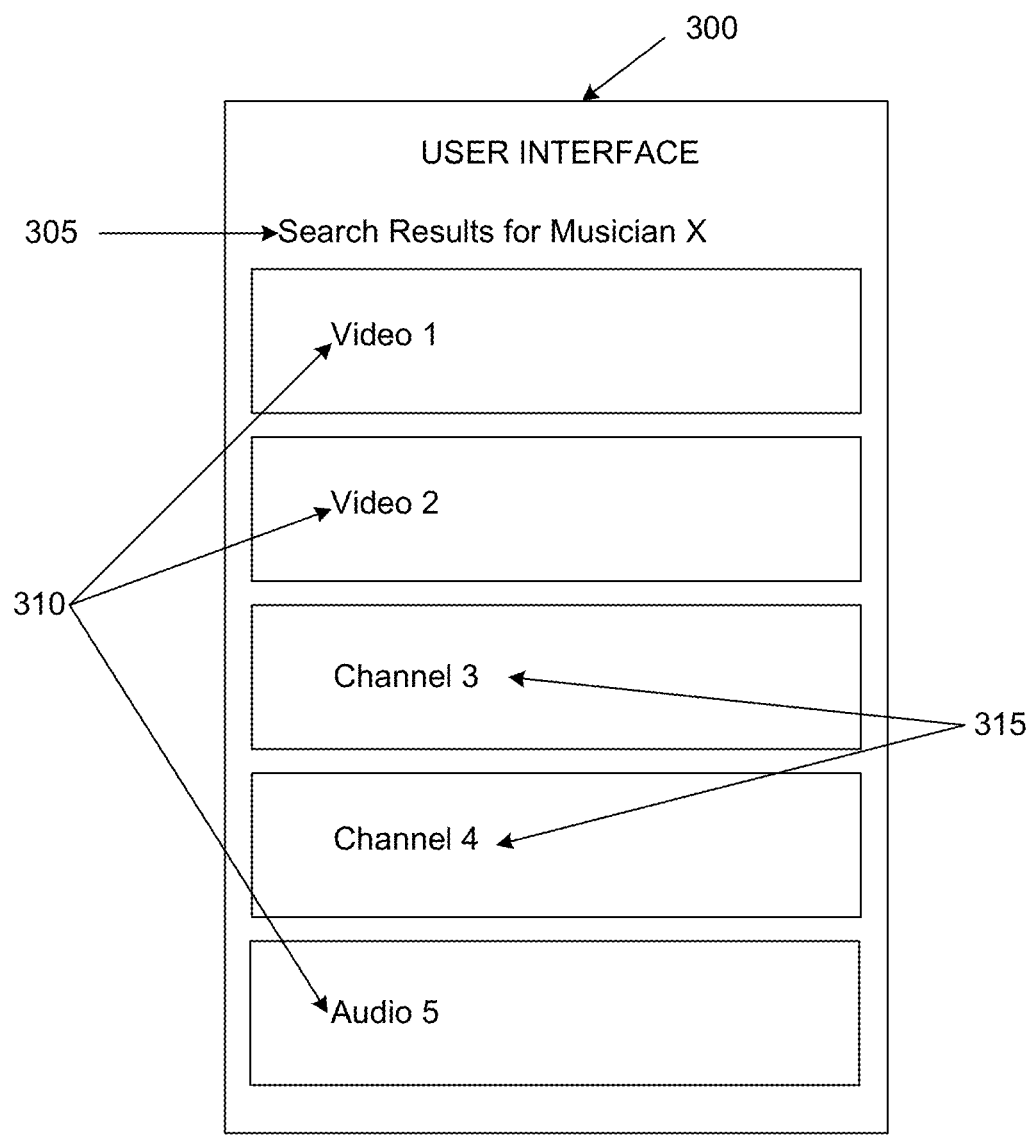
FIG. 3 illustrates a user interface, in accordance with one embodiment of the present disclosure.

FIG. 3 is an example user interface 300 in accordance with one embodiment of the present disclosure. For example, a user can be presented with the user interface 300 in response to a user searching for a topic of interest on a content hosting service. In another example, the user can be presented with the user interface 300 in response to the user providing the topic of interest in a wizard. In yet another example, the user can be presented with the user interface 300 in response to the user providing the topic of interest in a guide (e.g., a television guide). In yet another example, the user can be presented with the user interface 300 when the user chooses to view channels and/or selections of data content about a predefined topic. The user interface 300 can be provided to a user on a web page, in an application, embedded in a third party web page, etc.

The user interface 300 includes search results 305, one or more selections of data content 310, and one or more channels 315. The search results 305 are presented in response to a search query being submitted on a topic. The search results 305 include a list of one or more selections of data content 310 and one or more channels 315 that are related or associated with the topic submitted in the search query. For example, if a user searched for musician X, the search results 305 presented will be related to musician X. The search results 305 can include information from the search query, such as the topic submitted in the search query. For example, if a user searched for musician X, search results 305 is "Search Results for Musician X".

The selection of data content 310 can be a video, a blog, a newsletter, an audio selection, or any other type of data content that can be presented to a user of a content hosting service that are related to the search query. The selection of data content 310 can include the name of the selection of data content, such as "Video 1", "Video 2", "Audio 5", etc. The selection of data content 310 may include a link to the selection of data content such that a user can click on the link and be able to consume the selection of data content.

The one or more channels 315 can be channels related to the search query. A channel can be associated with a topic and can be data content available from a common source or data content having a common subject or theme. The one or more channels 315 can represent one or more selections of data content that are associated with the search query. Each channel 315 can include the channel name for the channel, such as "Channel 3" or "Channel 4." A channel 315 may include a link to the channel such that a user can click on the link and be able to view information about the channel, subscribe to the channel, consume one or more selections of data content associated with the channel, etc.

Figure 4:
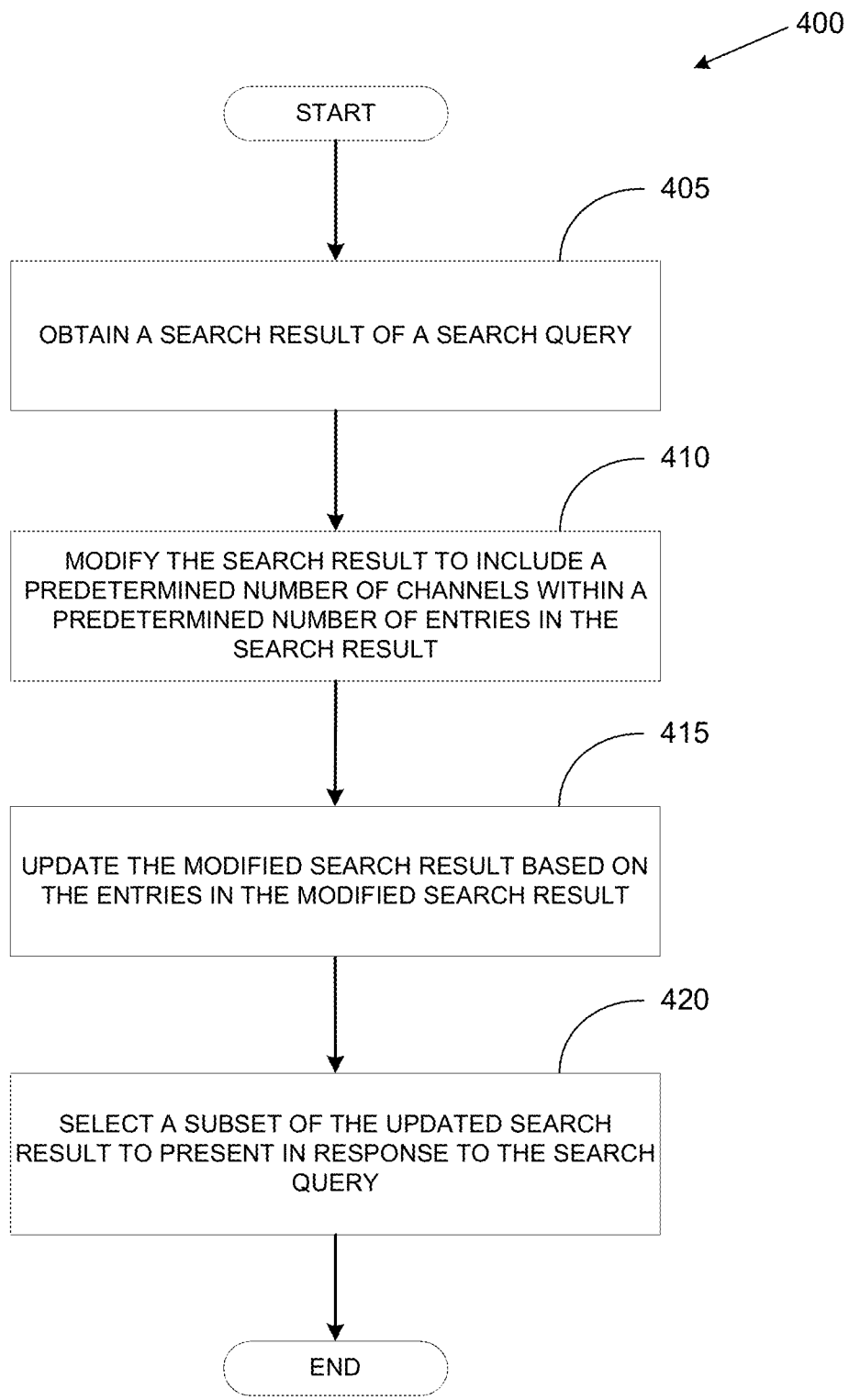
FIG. 4 is a flow diagram illustrating one embodiment for a method of ranking channels in search.

FIG. 4 is a flow diagram illustrating an embodiment for a method 400 of ranking channels in search. The method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 400 is performed by a server (e.g., the content server 110 of FIG. 1).

At block 405, processing logic obtains a search result of a search query. The search result can include one or more entries associated with a topic included in the search query. The entries can include data content, a channel associated with one or more selections of data content, etc. For example, if the search query is for snowboarding, the search results will include one or more entries related to snowboarding. In one embodiment, the search query is received in a user interface. The search query can include a topic submitted by a user of a service in a search field, etc. For example, a user entering the topic of snowboarding in a search field will cause a search query to be generated for snowboarding.

In one embodiment, processing logic obtains a search result of the search query by receiving the search result from a content hosting service, a computing system, a content server, etc. In an alternate embodiment, processing logic obtains a search result of the search query by requesting the search result from a content hosting service, a computing system, a content server, etc. In one embodiment, processing logic obtains the search result of the search query by sending a request including the topic of the search query to a sorting tree and receiving the search result from the sorting tree. In one embodiment, the request can further include a number of channels that should be included in the search result from the sorting tree. For example, for a search query for musician X, processing logic will send a request for musician X and 10 channels to the sorting tree if processing logic requires 10 channels in the search result. In this example, processing logic will receive a search result for musician X which will include 10 channels associated with musician X.

The sorting tree can include one or more levels, with each level of the sorting tree including one or more computing systems. Each computing system can have access to data content. The data content can include a channel, video, audio, newsletter, blog, etc. The Each computing system can search the data content available to the computing system based on the search query and can return the result of the search, including a predetermined number of channels if the predetermined number of channels was included in the request. The result of the search from each computing system can be provided to a computing system at the next level in the sorting tree until the results reach the highest level of the sorting tree. The sorting tree can send the results from the highest level of the sorting tree as the search result for the search query.

A channel can be data content available from a common source or data content having a common topic or theme. The data content can be digital content chosen by a user, digital content made available by a user, digital content uploaded by a user, digital content chosen by a content provider, digital content chosen by a broadcaster, etc. The channel can include an identifier for the channel (e.g., name of the channel) and identifiers for the one or more selections of digital content (e.g., names of the digital content).

At block 410, processing logic modifies the search result to include a predetermined number of channels within a predetermined number of entries in the search result. The predetermined number of channels can represent a number of channels to be included in the search result. The predetermined number of entries can represent the number of entries in the search result that should include the predetermined number of entries. For example, if the predetermined number of channels is 10 and the predetermined number of entries is 1000, processing logic modifies the search result such that 10 channels are included within the first 1000 entries of the search result. One embodiment of a method for modifying the search result is described below with reference to FIG. 5.

At block 415, processing logic can update the modified search result based on the entries in the modified search result. The modified search result can include a predefined number of entries, such as 1000 entries, 10000 entries, etc. One embodiment of a method for updating the modified search result based on the entries in the modified search result is described below with reference to FIG. 6.

At block 420, processing logic selects a subset of the updated search result to present in response to the search query. The number of entries in the subset can be predefined as a predefined number of entries to return in response to the search query. Processing logic can select the most highly ranked entries from the updated search result equal to the number of entries in the subset. For example, if the search query is to return 100 results, the most highly ranked 100 entries in the search result are selected as the subset of the updated search result. The subset can include at least one channel and at least one selection of digital content. For example, for a search query on musician X, the subset includes a channel associated with musician X and a music video featuring musician X.

Figure 5:
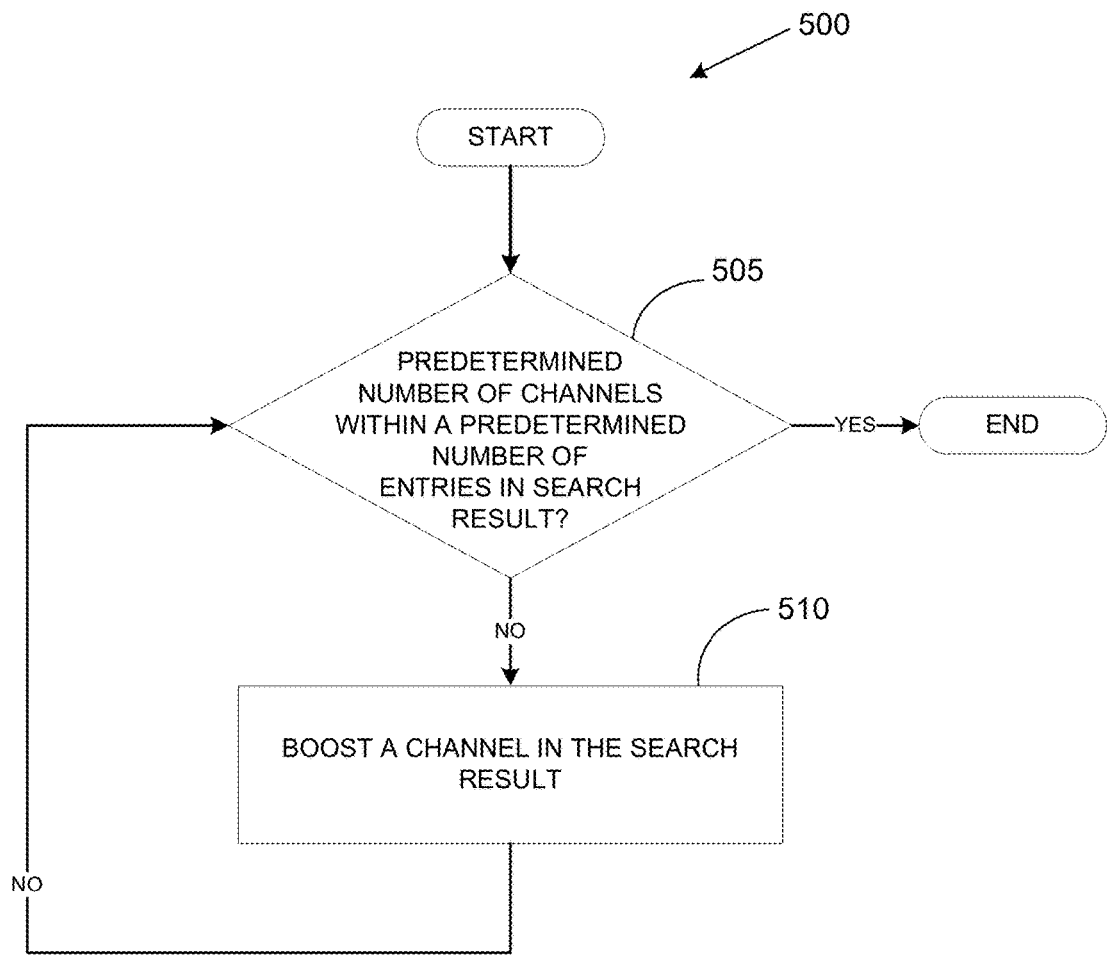
FIG. 5 is a flow diagram illustrating one embodiment for a method of modifying the search result.

FIG. 5 is a flow diagram illustrating an embodiment for a method 500 of modifying the search result. The method 500 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 500 is performed by a server (e.g., the content server 110 of FIG. 1).

At block 505, processing logic determines whether a predetermined number of channels are within a predetermined number of entries in a search result. The predetermined number of channels can be configurable and may be defined by a user, an administrator, a content server, a service. The predetermined number of channels can be a results guarantee to ensure that the search result includes enough channels to be ranked in the search result. The predetermined number of entries in a search result can be defined by a user, an administrator, a content server, a service, etc. In one embodiment, processing logic receives the search result from a group of computing systems, such as a sorting tree. Each computing system can search a subset of content available to the computing system.

Processing logic can determine whether a predetermined number of channels are within a predetermined number of entries in the search result by comparing the number of channels currently in the predetermined number of entries to the predefined number of channels. For example, if the predetermined number of channels is 20 and the predetermined number of entries in the search result is 500, then processing logic will determine if there are 20 channels within the top 500 entries in the search result. If processing logic determines that there are a predetermined number of channels within the predetermined number of entries in the search result, the method 500 ends. In one embodiment, if processing logic determines that there are a predetermined number of channels within the predetermined number of entries in the search result, processing logic selects the best channels in the search result as described below with reference to FIG. 6. If processing logic determines that there are not a predetermined number of channels within the predetermined number of entries in the search result, the method 500 proceeds to block 510.

At block 510, processing logic boost a channel in the search result. Boosting a channel can change the location of the channel in the search result. Processing logic can boost a channel in the search result such that the channel is within the predetermined number of entries in the search result. In one embodiment, processing logic boosts a channel in the search result by requesting each computing system in the sorting tree to return a predetermined number of channels and appending one or more of the returned channels to the search result. For example, processing logic requests each computing system to return one channel and appends one of the channels to the top 500 entries if the predetermined number of entries is 500. In an alternate embodiment, processing logic boosts a channel in the search result by updating the ranking of the channel to be within the predetermined number of entries. For example, if a channel was previously ranked 510 in the search result, processing logic will boost the channel by updating the ranking of the channel to 500 if the predetermined number of entries is 500. Upon boosting a channel in the search result, the method 500 returns to block 505 to determine if there are a predetermined number of channels within the predetermined number of entries in the search result based on the updated search result including the boosted channel. For example, if the search result previously included 10 channels in the top 500 entries, the results guarantee is 11 channels, and a channel was boosted to the top 500 entries for a total of 11 channels in the top 500 entries of the updated search result, processing logic will determine that there are 11 channels in the top 500 entries and the method 500 will end.

Figure 6:
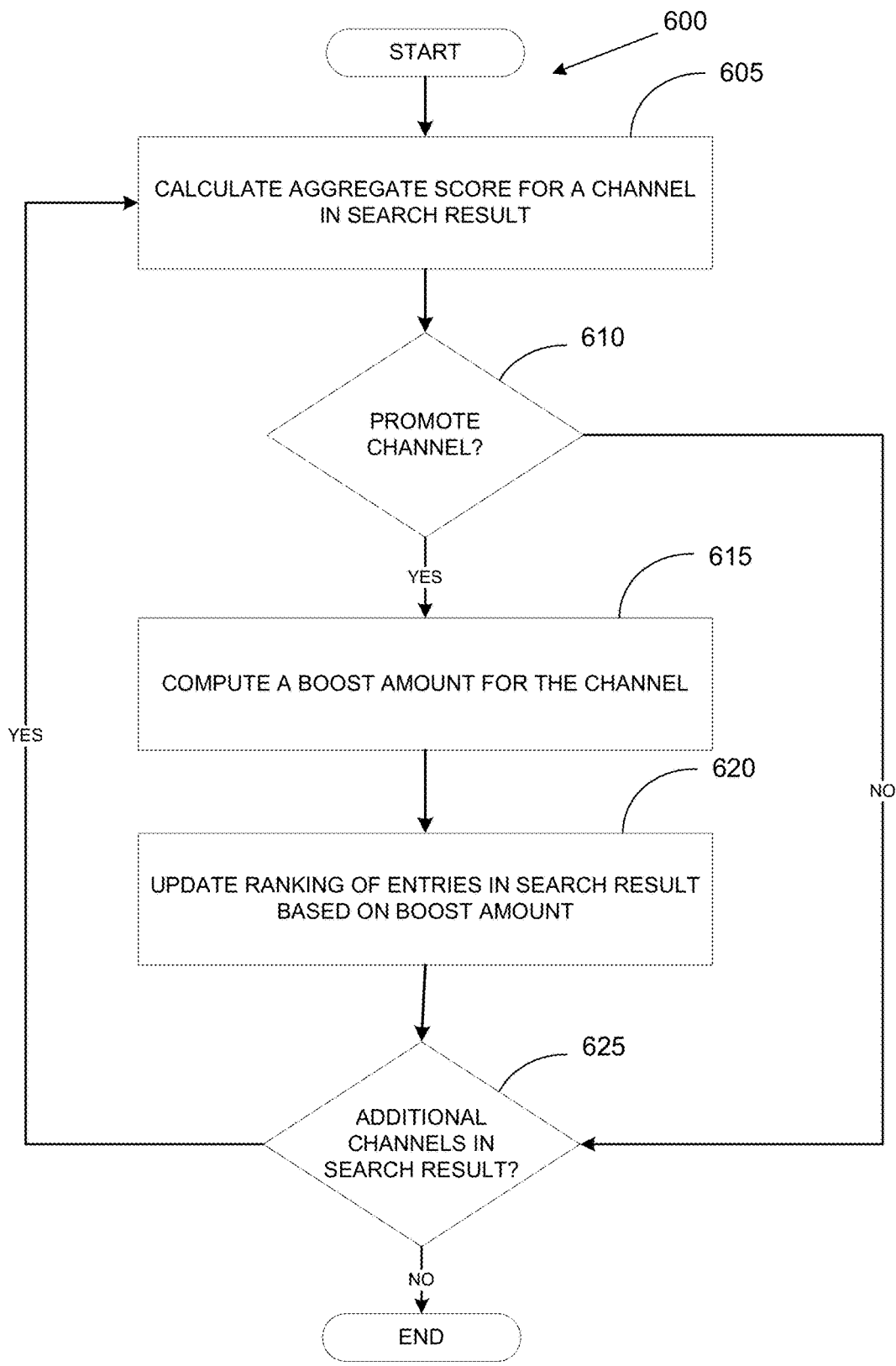
FIG. 6 is a flow diagram illustrating one embodiment for a method of updating a modified search result based on entries in a modified search result.

FIG. 6 is a flow diagram illustrating an embodiment for a method 600 of updating the modified search result based on the entries in the modified search result. The method 600 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 600 is performed by a server (e.g., the content server 110 of FIG. 1).

At block 605, processing logic calculates an aggregate score for a channel in the search result. In one embodiment, the search result includes a predetermined number of channels. Processing logic can calculate the aggregate score for a channel in the search result based on one or more features of the entries in the search result that are associated with the channel. The feature of an entry can be an association of the entry that can be used in ranking the entry (e.g., containment or container relationship). The features of an entry can include a topic feature, a channel feature, etc. A topic feature can be a topic associated with an entry in the search result. For example, a video about snowboarder A can have a topic feature of snowboarding. If entries in the search result have the same topic feature, a channel associated with the topic feature may be given a high aggregate score because the channel is relevant to the search query. A channel feature can be a channel associated with an entry in the search result. If the entry is a channel, the channel feature for the entry can be the channel itself. For example, the channel feature for channel X is channel X. If the entry is a selection of data content (e.g., video, audio, newsletter, blog, etc.), the channel feature for the entry can be a channel associated with the selection of data content. For example, the channel feature for a video about snowboarder A associated with channel X is channel X. If entries in the search result have the same channel feature, a channel associated with the channel feature (the channel) may be assigned a high aggregate score because the channel is relevant to the search query.

Processing logic can calculate the aggregate score for a channel by performing an aggregation of the features for the channel and applying a weighting function on the aggregation. To perform an aggregation of the features for the channel, processing logic can identify each entry in the search result that matches the feature for the channel. Therefore, if the feature is a channel feature, then each entry in the search result that has the same channel feature will be included in the aggregation of the features for the channel. In one example, there are 5 entries in the search results: entry 1 has a channel feature of X, entry 2 has a channel feature of Y, entry 3 has a channel feature of X, entry 4 has a channel feature of Z, and entry 5 has a channel feature of X. In this example, the aggregation of the channel feature for channel X will be include entry 1, entry 3, and entry 5.

Processing logic can apply a weighting function on the aggregation of the features for the channel by assigning a weight to the features and performing a computation on the weighted features. The weighting function can be position-based, score-based, correlation-based, etc. A weighting function that is position-based can assign a weight for an entry based on the position of the entry in the search results. For example, the weight of each entry that matches the feature can be a reciprocal of the location of the entry in the results. For example, if entry 1, entry 3, and entry 5 each have a channel feature of channel X, the weight of entry 1 can be 1/1, the weight of entry 3 can be 1/3, and the weight of entry 5 can be 1/5. A weighting function that is score-based can assign a weight for an entry based on a score associated with the entry (e.g., subscribability score). For example, the weight of each entry that matches the feature can be a score of the entry divided by a sum of scores of all the entries. A weighting function that is correlation-based can assign a weight for an entry based on the correlation of the entry to the query or based on the correlation of the channel associated with the entry to the query. If the feature (e.g., channel feature, topic feature, etc.) of an entry is tangentially related to the search query, it can be assigned a lower weight. If the feature of an entry is closely related to the search query, it can be assigned a higher weight. For example, if a channel feature of entry 1 is "snowboarder X official channel" and the search query is "snowboarder X," entry 1 is assigned a higher weight (e.g., weight close to 1.0, such as 0.9). In another example, if a topic feature of entry is "snowboarding" and the search query is "Lake Tahoe," entry 1 is assigned a lower weight (e.g., weight close to 0, such as 0.2). The weighting function can be based on other factors without departing from the scope of the present disclosure. The computation performed on the weighted features can be a sum of the weighed features, a product of the weighted features, etc. and can result in the aggregate score for the channel. For example, if entry 1, entry 3, and entry 5 each have a channel feature of channel X, the weight of entry 1 is 1/1, the weight of entry 3 is 1/3, and the weight of entry 5 is 1/5, and the weighted sum of the entries is 1/1+1/3+1/5, such that the aggregate score is 23/15.

At block 610, processing logic determines whether to promote the channel. Processing logic can promote a channel by updating a ranking of the channel in the search result. The ranking of a channel can represent the numbered location of an entry representing the channel in the search result. In one example, a channel X can have a ranking of 100, meaning that the channel is entry 100 in the search result.

In one embodiment, processing logic determines whether to promote the channel based on the aggregate score of the channel. In one embodiment, processing logic determines to promote the channel if the aggregate score of the channel is above a predefined threshold (e.g., 1.0). For example, if the aggregate score of a channel is 1.326 and the predefined threshold is 1.0, processing logic will determine to promote the channel because the aggregate score of 1.326 is greater than the threshold of 1.0.

In an alternate embodiment, processing logic determines whether to promote the channel based on whether any channels are included within a predefined number of entries in the search result. Upon determining that there is a channel within a predefined number of entries in the modified search result, processing logic can determine not to promote the channel. Upon determining that there is no channel within a predefined number of entries in the modified search result, processing logic can determine to promote the channel. For example, if the first 20 entries in the search result include one or more entries that is a channel, processing logic determines that the channel should not be promoted.

In another alternate embodiment, processing logic determines whether to promote the channel based on an attribute of the channel. The attribute of a channel can be an attribute of selections of data content associated with the channel, channel-level properties, etc. The attribute of selections of data content associated with the channel can be information specific to the selections of data content, such as the type of the selections of data content (e.g., video, audio, newsletter, blog, etc.), the format of the selection of data content (JPEG, MPEG, MP3, text, etc.), an artist associated with the selections of data content, the ranking in the search result of the selections of data content associated with the channel, etc. The channel-level properties can include how closely the channel matches the search query, the owner or source of the channel (e.g., a user is owner of the channel, a service is the owner of the channel, etc.), the type of the channel (e.g., user channel, curator channel, algorithmically generated channel, etc.), the topic of the channel, the cohesion of the channel (e.g., the percentage of selections of data content that are associated with the topic in the search query), the subscribability score of the channel, the type of content associated with the channel (e.g., vertical information of the channel such as songs, movie, television show, etc.), etc. If a channel has a specific attribute, processing logic can promote or not promote the channel based on the specific attribute. For example, if a channel has selections of data content that are blogs, the channel may not be promoted, but if a channel has selections of data content that are videos, the channel may be promoted. In another example, if artist XYZ is associated with a selection of content associated with channel ABC and the artist XYZ is also associated with a selection of content associated with channel XYZ_FAN_CHANNEL, the channel XYZ_FAN_CHANNEL may be promoted rather than channel ABC because XYZ_FAN_CHANNEL is a canonical channel for the artist XYZ. If the type of content for a channel is a specific type of data content, the channel can be considered "good" at the type of data content and can be promoted based on being "good" at the type of data content. For example, if most of the selections of data content associated with a channel are songs, the channel can be good at songs and can be promoted.

In another alternate embodiment, processing logic determines to always promote a channel in the search results.

At block 615, processing logic computes a boost amount for the channel. In one embodiment, processing logic computes the boost amount for the channel based on the aggregate score of the channel. Processing logic can computes the boost amount based on the aggregate score of the channel by performing a calculation on the aggregate score of the channel and the current ranking of the channel. For example, the calculation can be division, multiplication, addition, etc. For example, boost amount=ranking/aggregate score, etc. For example, if the aggregate score is 1.5 and the current ranking of the channel is 50, processing logic computes the boost amount=50/1.5=33.3.

In an alternate embodiment, processing logic computes the boost amount for the channel based on the ranking or position of selections of data content associated with the channel. If a predefined number of the selections of data content (e.g., videos) associated with the channel have a ranking that is within a top number of entries in the search result (e.g., top 20 entries in the search result), processing logic can compute a large boost amount for the channel. Processing logic can compute a boost amount for the channel such that the channel will be in the top number of entries in the search result (e.g., entry number 5) if a predefined number of selections of content have a ranking within a top number of entries. For example, if 3 videos associated with channel X are in the top 20 results but channel X has a ranking of 50, processing logic computes a boost amount of 45 for the channel such that channel X will be promoted to the $5^{th}$ entry in the search result (ranking of channel X will be 5). Processing logic can compute a mild boost amount for the channel if one or more selections of content associated with the channel are not within a top number of entries in the search result. For example, if a video associated with channel X has a ranking of 25 in the search result and channel X has a ranking of 30, processing logic computes a mild boost amount for the channel, such as a boost amount of 4, to bring the channel closer in the search result to the video that is associated with channel X. Processing logic can compute a boost amount of zero or another small value if one or more selections of content associated with the channel are not within a top number of entries in the search result. For example, if 2 videos associated with channel X are outside of the top 50 results, processing logic will compute a boost amount of 0 for the channel. The boost amount can be computed using other features of the selections of content associated with a channel without departing from the scope of the present disclosure.

In another alternate embodiment, processing logic computes the boost amount for the based on the ranking or position of selections of data content associated with the channel. If a channel is "good" at a specific type of selections of data content (e.g., songs), the boost amount for the channel is computed such that the channel ranks highly within the search results or such that the channel ranks near selections of data content that are match the specific type of selections of data content (e.g., near videos that include songs). In one example, if a channel X has a ranking of 36 and is good at songs and entries 3, 4, and 9 in the search results are songs, the boost amount is computed to be 28 in order to update the ranking of channel X to 8 such that channel X is ranked near the songs. In another example, if a channel X has a ranking of 36 and is good at songs, the boost amount is computed to be 20 in order to update the ranking of channel X to 16 such that channel X is ranked in the top 20 entries in the search results.

In some embodiments, processing logic determines the boost amount of the channel using one or more of the described embodiments and selects the maximum boost amount.

At processing block 620, processing logic updates the ranking of one or more entries in the search result based on the boost amount. Processing logic can update the ranking of one or more entries in the search result by updating the ranking of the channel based on the boost amount and updating the ranking of each of the entries in the search result that come after the updated ranking of the channel. For example, if channel X has a ranking of 100 before the channel has been boosted and the boost amount is computed to be 90, processing logic updates the ranking of channel X to 100−90=10 and the ranking of the remaining entries are shifted down by one (e.g., the previous tenth entry is shifted down to be the eleventh entry, the previous eleventh entry is shifted down to be the twelfth entry, etc.).

At block 625, processing logic determines if an additional channel in the search result needs an aggregate score. In one embodiment, processing logic determines if an additional channel needs an aggregate score by accessing the channels in the search result and determining if each channel in the search result has a corresponding aggregate score. If processing logic determines that an additional channel needs an aggregate score, the method 600 returns to block 605 to calculate aggregate score for the next channel in the search result. If processing logic that no additional channel needs an aggregate score, the method 600 ends.

Figure 7:
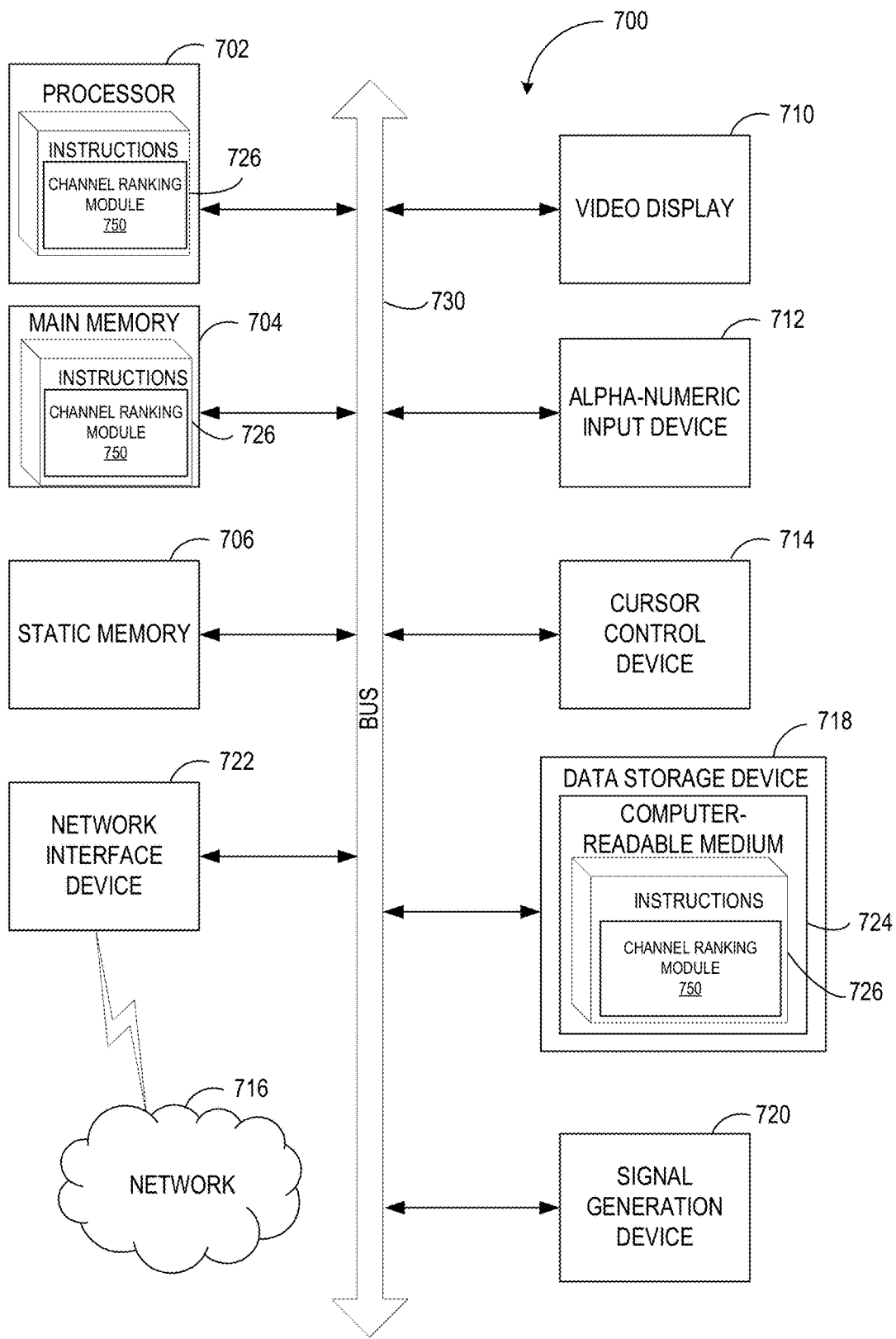
FIG. 7 is a block diagram of an exemplary computing system that may perform one or more of the operations described herein.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 718 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 716 via the network interface device 722.

In one embodiment, the instructions 726 include instructions for a channel ranking module 750, which may correspond to channel ranking module 120 of FIG. 1, and/or a software library containing methods for ranking channels in search. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying," "updating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

We claim:

1. A method comprising:
   identifying, by a processing device, an entry representing a channel from a plurality of entries within a search result, the search result generated in response to a search query, the plurality of entries comprising at least one entry that represents a content item of a type other than a channel type, wherein each of the plurality of entries is associated with a respective ranking;
   determining that a current position of the entry representing the channel is to be improved;
   adjusting, by the processing device, a respective ranking of the channel to improve the current position of the entry representing the channel in the search result as compared to the at least one entry that represents the content item of the type other than the channel type; and
   providing, by the processing device, at least a subset of entries from the plurality of entries for presentation in response to the search query, the at least subset of entries comprising the entry representing the channel at the improved position as compared to the at least one entry that represents the content item of the type other than the channel type.

2. The method of claim 1, further comprising:
   prior to adjusting the ranking of the channel, determining that a number of entries representing channels within a predetermined number of entries in the search result is below a first threshold; and
   determining that the entry representing the channel is not within the predetermined number of entries in the search result.

3. The method of claim 2, further comprising:
   upon adjusting the ranking of the channel, determining whether an updated number of entries representing channels within the predetermined number of entries in the search result is below the first threshold, the updated number of entries reflecting the entry represented by the channel with adjusted ranking; and
   upon determining that the updated number of entries representing channels within the predetermined number of entries in the search result is below the first threshold, adjusting a ranking of another channel represented by another entry from the search result to cause the another entry to be included within the predetermined number of entries in the search result.

4. The method of claim 2, wherein determining whether the current position of the entry representing the channel is to be improved comprises:
   identifying one or more content items that are each represented by an entry within the search result, the identified content items provided by the channel;
   determining a weighted score for each of the identified content items based on at least one of a position of a respective entry in the search result, a subscribability score of a respective content item, or correlation of the respective content item to the search query;
   calculating an aggregate score for the channel with respect to the search query by adding the weighted score for each of the identified content items; and
   determining that the current position of the entry representing the channel is to be improved, responsive to the aggregate score being above a second threshold.

5. The method of claim 4, wherein adjusting the ranking of the channel comprises:
   calculating a boost amount based on the ranking of the channel and the aggregate score; and
   updating the ranking of the channel by the boost amount.

6. The method of claim 2, wherein determining whether the current position of the entry representing the channel is to be improved comprises:
   determining an attribute related to the channel; and
   determining that the current position of the entry representing the channel is to be improved, responsive to the attribute related to the channel satisfying a condition.

7. The method of claim 6, wherein the attribute related to the channel is at least one of:
   an attribute of the channel, the attribute of the channel comprising at least one of a correlation of the channel to the search query, a source of the channel, a type of the channel, a topic of the channel, a cohesion of the channel, or a subscribability score of the channel, or
   an attribute of a content item provided by the channel and represented by an entry within the search result, the attribute of the content item comprising at least one of a type of the content item, a format of the content item, an artist associated with the content item, or a ranking of the content item in the search result.

8. The method of claim 2, wherein adjusting the ranking of the channel comprises:
calculating a boost amount based on the current position of the entry representing the channel in the search result and the first threshold; and
updating the ranking of the channel by the boost amount.

9. The method of claim 1, wherein identifying the entry representing the channel in the plurality of entries from the search result comprises:
identifying channel data of the channel, the channel data comprising at least one of a topic of the channel or a name of the channel; and
determining that the channel is relevant to the search query based on the channel data.

10. The method of claim 1, wherein the subset of entries provided for presentation in response to the search query comprises, in addition to the entry representing the channel, an entry representing a content item related to the search query, wherein the content item is at least one of a digital video, a streaming video, an image, a digital audio, a streaming audio, social media information, or a newsletter.

11. A non-transitory computer readable storage medium having instructions that, when executed by a processing device, cause the processing device to perform operations comprising:
identifying, by the processing device, an entry representing a channel from a plurality of entries within a search result, the search result generated in response to a search query, the plurality of entries comprising at least one entry that represents a content item of a type other than a channel type, wherein each of the plurality of entries is associated with a respective ranking;
determining that a current position of the entry representing the channel is to be improved;
adjusting, by the processing device, a respective ranking of the channel to improve the current position of the entry representing the channel in the search result as compared to the at least one entry that represents the content item of the type other than the channel type; and
providing, by the processing device, at least a subset of entries from the plurality of entries for presentation in response to the search query, the at least subset of entries comprising the entry representing the channel at the improved position as compared to the at least one entry that represents the content item of the type other than the channel type.

12. The non-transitory computer readable storage medium of claim 11, wherein the operations further comprising:
prior to adjusting the ranking of the channel, determining that a number of entries representing channels within a predetermined number of entries in the search result is below a first threshold; and
determining that the entry representing the channel is not within the predetermined number of entries in the search result.

13. The non-transitory computer readable storage medium of claim 12, wherein determining whether the current position of the entry representing the channel is to be improved comprises:

identifying one or more content items that are each represented by an entry within the search result, the identified content items provided by the channel;
determining a weighted score for each of the identified content items based on at least one of a position of a respective entry in the search result, a subscribability score of a respective content item, or correlation of the respective content item to the search query;
calculating an aggregate score for the channel with respect to the search query by adding the weighted score for each of the identified content items; and
determining that the current position of the entry representing the channel is to be improved, responsive to the aggregate score being above a second threshold.

14. The non-transitory computer readable storage medium of claim 13, wherein adjusting the ranking of the channel comprises:
calculating a boost amount based on the ranking of the channel and the aggregate score; and
updating the ranking of the channel by the boost amount.

15. A computing device comprising:
a memory; and
a processing device operatively coupled to the memory, wherein the processing device is configured to:
identify, by the processing device, an entry representing a channel from a plurality of entries within a search result, the search result generated in response to a search query, the plurality of entries comprising at least one entry that represents a content item of a type other than a channel type, wherein each of the plurality of entries is associated with a respective ranking;
determining that a current position of the entry representing the channel is to be improved;
adjust, by the processing device, a respective ranking of the channel to improve the current position of the entry representing the channel in the search result as compared to the at least one entry that represents the content item of the type other than the channel type; and
provide, by the processing device, at least a subset of entries from the plurality of entries for presentation in response to the search query, the at least subset of entries comprising the entry representing the channel at the improved position as compared to the at least one entry that represents the content item of the type other than the channel type.

16. The computing device of claim 15, wherein the processing device is further configured to:
prior to adjust the ranking of the channel, determine that a number of entries representing channels within a predetermined number of entries in the search result is below a threshold; and
determine that the entry representing the channel is not within the predetermined number of entries in the search result.

17. The computing device of claim 16, wherein the processing device is configured to adjust the ranking of the channel by:
calculating a boost amount based on the current position of the entry representing the channel in the search result and the threshold; and
updating the ranking of the channel by the boost amount.

* * * * *